United States Patent
Hoshi et al.

(10) Patent No.: US 9,172,281 B2
(45) Date of Patent: Oct. 27, 2015

(54) MOTOR

(71) Applicant: KABUSHIKI KAISHA YASKAWA DENKI, Kitakyushu-shi (JP)

(72) Inventors: Toshiyuki Hoshi, Kitakyushu (JP); Kenji Watanabe, Kitakyushu (JP)

(73) Assignee: KABUSHIKI KAISHA YASKAWA DENKI, Kitakyushu-Shi (JP)

( * ) Notice: Subject to any disclaimer, the term of this patent is extended or adjusted under 35 U.S.C. 154(b) by 0 days.

(21) Appl. No.: 14/312,694

(22) Filed: Jun. 24, 2014

(65) Prior Publication Data

US 2014/0300212 A1    Oct. 9, 2014

Related U.S. Application Data

(63) Continuation of application No. PCT/JP2011/080243, filed on Dec. 27, 2011.

(51) Int. Cl.
| | |
|---|---|
| *H02K 41/02* | (2006.01) |
| *H02K 3/12* | (2006.01) |
| *H02K 3/18* | (2006.01) |
| *H02K 41/03* | (2006.01) |
| *H02K 3/28* | (2006.01) |

(52) U.S. Cl.
CPC .. *H02K 3/12* (2013.01); *H02K 3/18* (2013.01); *H02K 3/28* (2013.01); *H02K 41/031* (2013.01)

(58) Field of Classification Search
CPC ......... H02K 3/18; H02K 3/28; H02K 41/031; H02K 41/03
USPC ............................................ 310/12.01–12.33
See application file for complete search history.

(56) References Cited

U.S. PATENT DOCUMENTS

| | | | |
|---|---|---|---|
| 2,394,075 A | 2/1946 | Kimball | |
| 3,466,480 A | 9/1969 | Bunner at al. | |
| 5,642,013 A | 6/1997 | Wavre | |
| 2004/0201303 A1 | 10/2004 | Zhang et al. | |

(Continued)

FOREIGN PATENT DOCUMENTS

| | | |
|---|---|---|
| JP | 58-22575 | 2/1983 |
| JP | 2004-260985 | 9/2004 |
| JP | 4304999 B2 | 9/2004 |
| JP | 2005-261117 | 9/2005 |
| JP | 2008-211918 | 9/2008 |

OTHER PUBLICATIONS

International Search Report for corresponding International Application No. PCT/JP2011/080243 Apr. 3, 2012.

(Continued)

*Primary Examiner* — Hanh Nguyen
(74) *Attorney, Agent, or Firm* — Mori & Ward, LLP (57) ABSTRACT

The disclosure discloses a motor including a stator and a mover. The stator and the mover are arranged facing each other so as to be relatively movable via a magnetic air gap. Any one of the stator and the mover includes a yoke, a plurality of teeth, and a plurality of coils. The plurality of teeth are disposed protruding from the yoke to the magnetic air gap side. The plurality of coils are wound around the plurality of teeth. The plurality of coils include, for each phase, coil groups. Each of the coil groups includes a plurality of the coils. The coils are continuously arranged along the relative movement direction and are in-phase with each other and have the same wire diameter with each other. The coil group includes at least one the coil in which a coil width is larger than a teeth pitch.

5 Claims, 8 Drawing Sheets

(56) References Cited

U.S. PATENT DOCUMENTS

| | | |
|---|---|---|
| 2008/0211338 A1 | 9/2008 | Koka et al. |
| 2009/0256428 A1* | 10/2009 | Jajtic et al. ................. 310/12.25 |
| 2010/0013327 A1 | 1/2010 | Hoppe |
| 2010/0026104 A1* | 2/2010 | Jajtic et al. ................. 310/12.22 |
| 2011/0169369 A1 | 7/2011 | Liang et al. |
| 2012/0025634 A1* | 2/2012 | Dajaku ..................... 310/12.21 |

OTHER PUBLICATIONS

Written Opinion for corresponding International Application No. PCT/JP2011/080243 Apr. 3, 2012.

Korean Office Action for corresponding KR Application No. 10-2014-7017684, Jul. 8, 2015.

Extended European Search Report for Corresponding EP Application No. 11878688.8-1905, Jul. 31, 2015.

\* cited by examiner

NUMBER OF TURNS N = 10 (LAYER) X 1 (ROW) X 2 (COIL) = 20 (TURNS)

FIG. 4
PRIOR ART

NUMBER OF TURNS N = 20 (LAYER) X 2 (ROW) X 2 (COIL) = 80 (TURNS)

FIG. 5
PRIOR ART

NUMBER OF TURNS N = 30 (LAYER) X 3 (ROW) X 2 (COIL) = 180 (TURNS)

FIG. 6
COMPARATIVE EXAMPLE

NUMBER OF TURNS N1 OF FIRST COIL = 10 (LAYER) X 1 (ROW) = 10 (TURNS)
NUMBER OF TURNS N2 OF SECOND COIL = 20 (LAYER) X 2 (ROW) = 40 (TURNS)
TOTAL NUMBER OF TURNS N = 10 (TURNS) + 40 (TURNS) = 50 (TURNS)

FIG. 7
COMPARATIVE EXAMPLE

NUMBER OF TURNS N1 OF FIRST COIL = 20 (LAYER) X 2 (ROW) = 40 (TURNS)
NUMBER OF TURNS N2 OF SECOND COIL = 30 (LAYER) X 3 (ROW) = 90 (TURNS)
TOTAL NUMBER OF TURNS N = 40 (TURNS) + 90 (TURNS) = 130 (TURNS)

FIG. 8
EMBODIMENT

NUMBER OF TURNS N1 OF FIRST COIL = 15 (LAYER) X 2 (ROW) = 30 (TURNS)
NUMBER OF TURNS N2 OF SECOND COIL = 15 (LAYER) X 1 (ROW) = 15 (TURNS)
TOTAL NUMBER OF TURNS N = 30 (TURNS) + 15 (TURNS) = 45 (TURNS)

FIG. 9
EMBODIMENT

NUMBER OF TURNS N1 OF FIRST COIL = 25 (LAYER) X 3 (ROW) = 75 (TURNS)
NUMBER OF TURNS N2 OF SECOND COIL = 25 (LAYER) X 2 (ROW) = 50 (TURNS)
TOTAL NUMBER OF TURNS N = 75 (TURNS) + 50 (TURNS) = 125 (TURNS)

MOTOR

CROSS-REFERENCE TO RELATED APPLICATION

This is a continuation application of PCT/JP2011/80243, filed Dec. 27, 2011, which was not published under PCT article 21(2) in English.

BACKGROUND OF THE INVENTION

1. Field of the Invention

A disclosed embodiment relates to an AC motor.

2. Description of the Related Art

In a prior art, there is described a technique which relates to a three-phase armature winding having three continuous in-phase coils, and more particularly applies degree of freedom to a number of turns of the coil without lowering a space factor, by winding with coils having two kinds of wire diameters.

SUMMARY OF THE INVENTION

According to one aspect of the disclosure, there is provided a motor comprising a stator and a mover. The stator and the mover are arranged facing each other so as to be relatively movable via a magnetic air gap. Any one of the stator and the mover includes a yoke, a plurality of teeth, and a plurality of coils. The plurality of teeth are disposed protruding from the yoke to the magnetic air gap side. The plurality of coils are wound around the plurality of teeth. The plurality of coils include, for each phase, coil groups. Each of the coil groups includes a plurality of the coils. The coils are continuously arranged along the relative movement direction and are in-phase with each other and have the same wire diameter with each other. The coil group comprises at least one the coil in which a coil width in the relative movement direction is larger than a teeth pitch in the relative movement direction.

DETAILED DESCRIPTION OF THE EMBODIMENTS

A description will be given below of an embodiment with reference to the accompanying drawings.

<Configuration of Motor>

Figure 1:
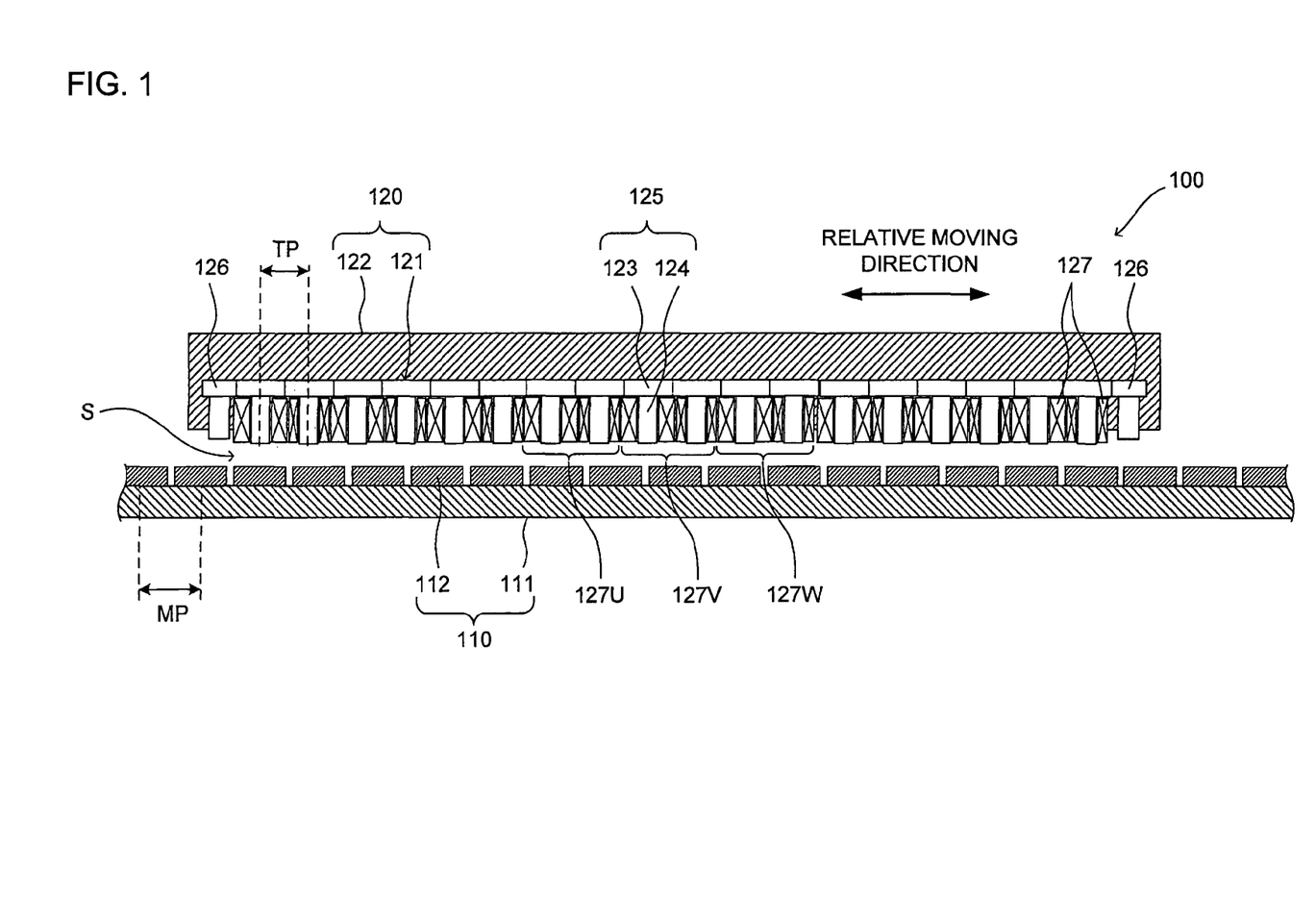
FIG. 1 is a vertical cross sectional view showing a configuration of a motor according to the present embodiment.

A motor 100 according to the present embodiment is a linear synchronous motor which employs three-phase alternating current. FIG. 1 shows a case that a slot combination of the motor 100 is 5-pole and 6-slot (5P6S) as an example. As shown in FIG. 1, the motor 100 has a stator 110 and a mover 120 which are arranged facing each other so as to be relatively movable via a magnetic air gap S.

The stator 110 has a tabular yoke 111, and a plurality of permanent magnets 112 arranged on the yoke 111 at a fixed interval (at a magnet pitch MP) in a relative movement direction. The mover 120 has a core 121, and a mover base 122 made of resin, for example, and disposed so as to cover the core 121. The core 121 is structured such that split cores 125 each including a yoke 123 and teeth 124 disposed protruding from the yoke 123 to a magnetic air gap S side are arranged side by side at a fixed interval (at a teeth pitch TP) in a relative movement direction, and sub teeth 126 are arranged in both end portions of the split cores 125. In the present embodiment, the core 121 is formed as the split configuration, however, may be formed into an integral configuration.

Figure 2:
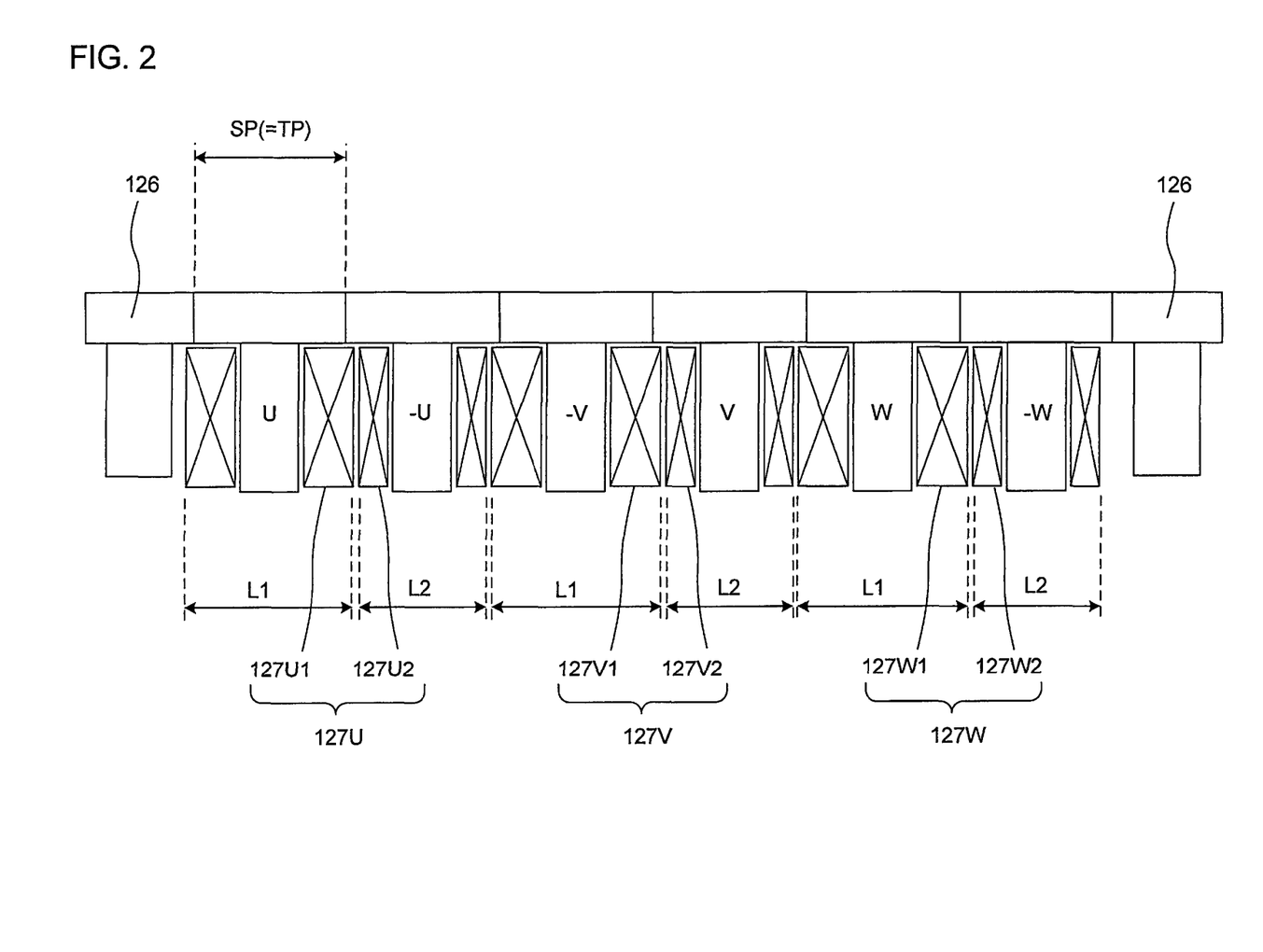
FIG. 2 is an explanatory view for explaining a coil arrangement configuration of a mover in the motor.

A plurality of coils 127 is wound around each of slots which are formed between the respective teeth 124 of the core 121. As shown in FIG. 2, in the motor 100 in which the slot combination is 5-pole and 6-slot (5P6S), two in-phase coils 127 are continuously arranged in the relative movement direction (a lateral direction in FIG. 2). Reference symbols U, V and W shown in FIG. 2 denote the respective coils 127 corresponding to a U phase, a V phase and a W phase, and the coils 127 having opposite winding direction thereto are respectively shown by –U, –V and –W.

The mover 120 has a coil group including two continuously arranged in-phase coils 127 for each phase (U phase, V phase, W phase). The coil group 127U corresponding to the U phase has a first coil 127U1 and a second coil 127U2 which are two in-phase (U-phase) coils continuously arranged in the relative movement direction. The first coil 127U1 is structured such that a coil width L1 is larger than a slot pitch SP (=teeth pitch TP), and the second coil 127U2 is structured such that a coil width L2 is smaller than the slot pitch SP. Further, wire diameters are the same in the first coil 127U1 and the second coil 127U2. The slot pitch SP is identical to a length in the relative movement direction of the yoke 123 in each of the split cores 125.

In the same manner, the coil group 127V corresponding to the V phase has a first coil 127V1 and a second coil 127V2 which are continuously arranged in the relative movement direction, are in-phase (V-phase) coils and have the same wire diameter. The first coil 127V1 is structured such that a coil width L1 is larger than the slot pitch SP, and the second coil 127V2 is structured such that a coil width L2 is smaller than the slot pitch SP. Further, in the same manner, the coil group 127W corresponding to the W phase has a first coil 127W1 and a second coil 127W2 which are continuously arranged in the relative movement direction, are in-phase (W-phase) coils and have the same wire diameter. The first coil 127W1 is structured such that a coil width L1 is larger than the slot pitch SP, and the second coil 127W2 is structured such that a coil width L2 is smaller than the slot pitch SP.

Sum of the coil width L1 of the first coil and the coil width L2 of the second coil in each phase approximately coincides with twice the slot pitch SP. According to the configuration mentioned above, an arrangement relationship of the coil width in the case that the coil groups 127U, 127V, 127W in each phase are arranged side by side in the relative movement direction comes to "large, small", "large, small" and "large, small" as shown in FIG. 2, and the coils 127 can be arranged with no gap in each phase. Therefore, since it is possible to prevent a space factor of the coil from being lowered, it is possible to prevent a motor constant from being lowered.

As shown in FIG. 1, the motor 100 has three sets of coil groups 127U, 127V, 127W shown in FIG. 2 in the relative movement direction, but the number of sets is not limited to this. Further, the example is structured such that the mover 120 has the coil groups 127U, 127V, 127W, but the mover and the stator may be structured such that the stator has the coil groups 127U, 127V, 127W by inverting the corresponding relationship between the mover and the stator.

Effect of Embodiment

The greatest feature of the motor having the configuration mentioned above exists in a point that the motor 100 has the first coils 127U1, 127V1, 127W1 in which the coil width L1 is larger than the slot pitch SP (=teeth pitch TP). A description will be given below of an effect obtained by the feature while using comparative examples.

Figure 3:
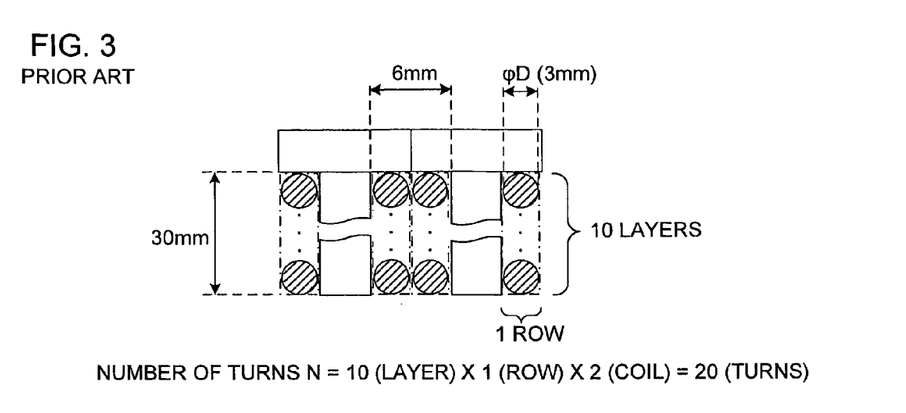
FIG. 3 is an explanatory view for explaining an example of a coil configuration of prior arts.

In a poly-phase AC motor employing three-phase alternating current, in order to obtain an output characteristic (a thrust-speed characteristic) corresponding to demand of user, it is necessary to set a number of turns of the coil in each phase to an appropriate value. However, the motor of the prior arts has a problem that the number of turns of the coil jumps greatly. For example, as shown in FIG. 3, in a motor having a slot combination (5P6S) in which two in-phase coils are continuously arranged, for example, in the case that a height of the slot is set to 30 mm, and a width of the slot (a gap between the adjacent teeth) is set to 6 mm, the number of turns of each coil is 10 layers×1 row (10 turns) in wire diameter φD=3 mm, and a total number of turns N of one phase group=10 turns×2 coils=20 turns is achieved.

Figure 4:
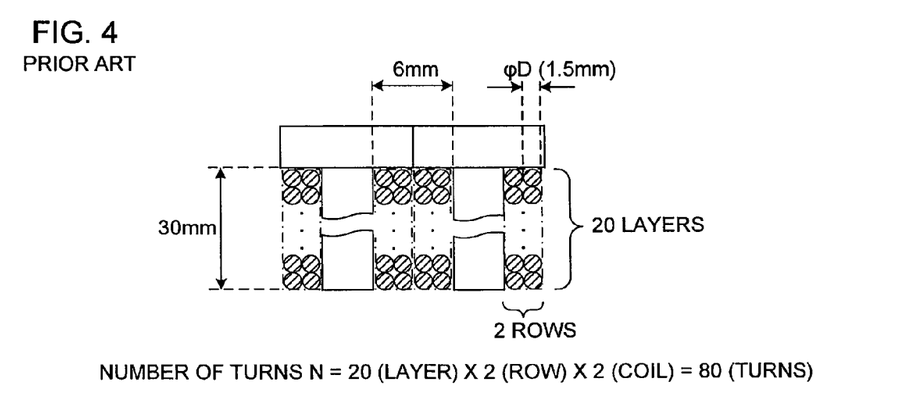
FIG. 4 is an explanatory view for explaining an example of a coil configuration of prior arts.
Figure 5:
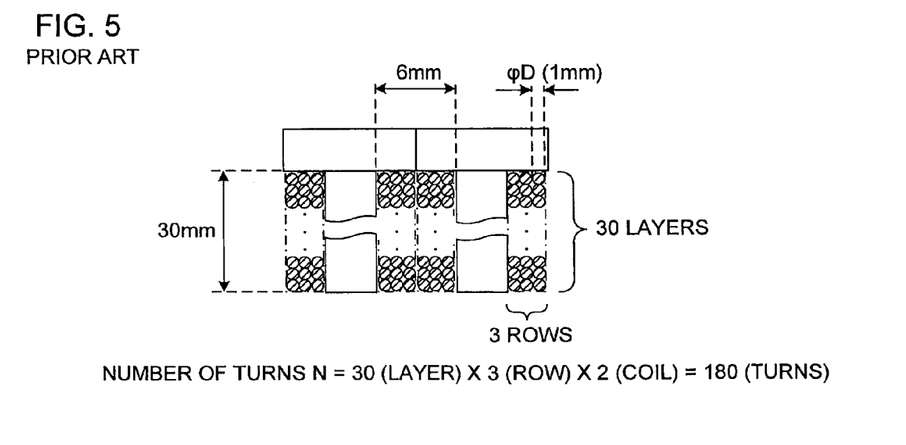
FIG. 5 is an explanatory view for explaining an example of a coil configuration of prior arts.

In the case that the number of turns is increased under a condition that the space factor is approximately fixed, the number of turns in each coil is 20 layers×2 rows (40 turns), and the total number of turns N of one phase group=40 turns×2 coils=80 turns is achieved, for example, in the wire diameter φD=1.5 mm as shown in FIG. 4. Further, the number of turns in each coil is 30 layers×3 rows (90 turns), and the total number of turns N of one phase group=90 turns×2 coils=180 turns is achieved, for example, in the wire diameter φD=1 mm as shown in FIG. 5. As mentioned above, the number of turns N becomes four times and nine times as the wire diameter φD becomes smaller and the jumping amount becomes greater. Therefore, it is hard to set to the number of turns which corresponds to the demand of the user.

Figure 6:
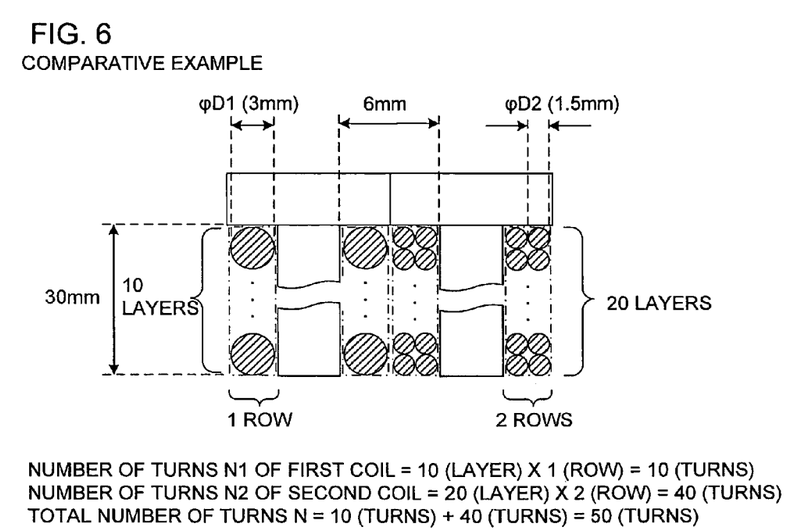
FIG. 6 is an explanatory view for explaining an example of a coil configuration of a comparative example.
Figure 7:
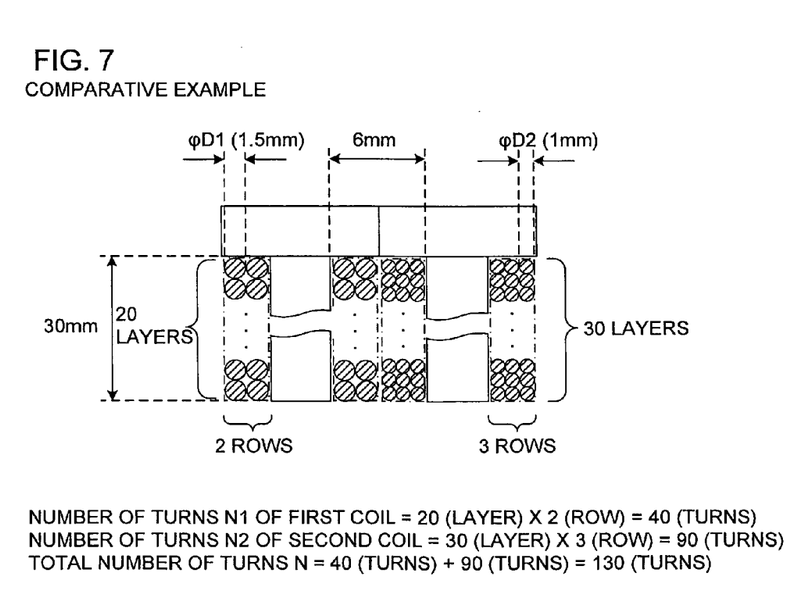
FIG. 7 is an explanatory view for explaining an example of a coil configuration of a comparative example.

Accordingly, thinking about a case that an intermediate number of turns is obtained by changing the wire diameters and the numbers of turns of two in-phase coils. Configurations of this case will be shown in FIGS. 6 and 7 as the comparative examples. For example, as shown in FIG. 6, in the case of the wire diameter φD1 of the first coil (the coil in a left side of FIG. 6)=3 mm, and the wire diameter φD2 of the second coil (the coil in a right side of FIG. 6)=1.5 mm, the number of turns N1 of the first coil is 10 layers×1 row (10 turns), the number of turns N2 of the second coil is 20 layers×2 rows (40 turns), and the total number of turns N=10 turns+40 turns=50 turns is achieved. Further, for example, as shown in FIG. 7, in the case of the wire diameter φD1 of the first coil (the coil in a left side of FIG. 7)=1.5 mm, and the wire diameter φD2 of the second coil (the coil in a right side of FIG. 7)=1 mm, the number of turns N1 of the first coil is 20 layers×2 rows (40 turns), the number of turns N2 of the second coil is 30 layers×3 rows (90 turns), and the total number of turns N=40 turns+90 turns=130 turns is achieved. As mentioned above, an intermediate number of turns can be obtained. However, since the wire diameters are different for each coil, it is impossible to wind the continuous in-phase coil with a single stroke, and there is a problem that productivity is lowered.

Consequently, the inventors of the present application have devoted themselves to research and develop in consideration of the matter that the wire diameter of the coil is restricted and has a reduced option (for example, in the above example, only the wire diameter φD=3 mm, 1.5 mm and 1 mm can be selected in the range of 1 mm≤φD≤3 mm). As a result, the inventors of the present application have derived overriding of the technical common sense that the coils are designed so that the coil width L of each coil is within the slot pitch SP, and have derived a configuration according to the present embodiment for the first time. In other words, the present embodiment is structured, as mentioned above, such that the in-phase coil groups 127U, 127V, 127W each including a plurality of (two in the present embodiment) coils which are continuously arranged and have the same wire diameter respectively have the coils 127U1, 127V1, 127W1 in which the coil width L1 is larger than the slot pitch SP. In other words, there is not the restriction that the coil width L is within the slot pitch SP.

Figure 8:
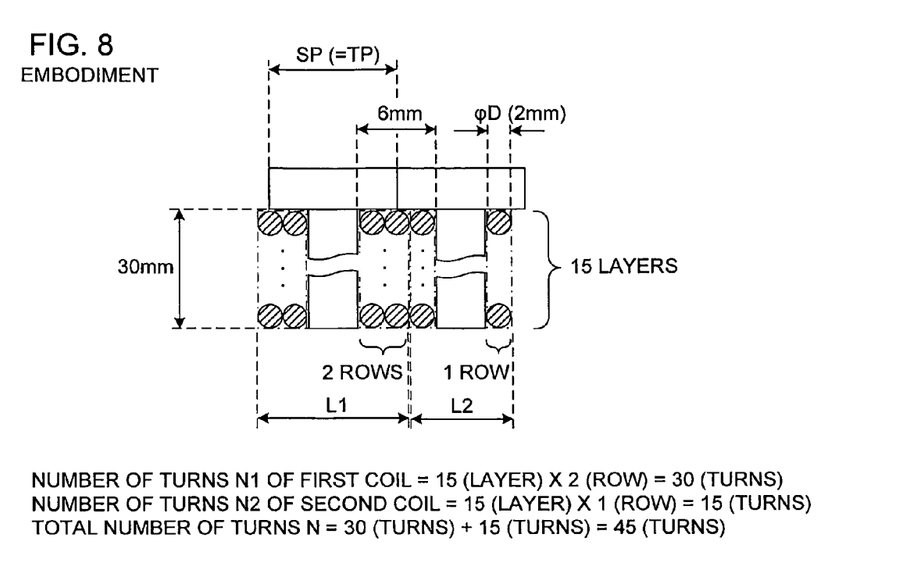
FIG. 8 is an explanatory view for explaining an example of a coil configuration of an embodiment.
Figure 9:
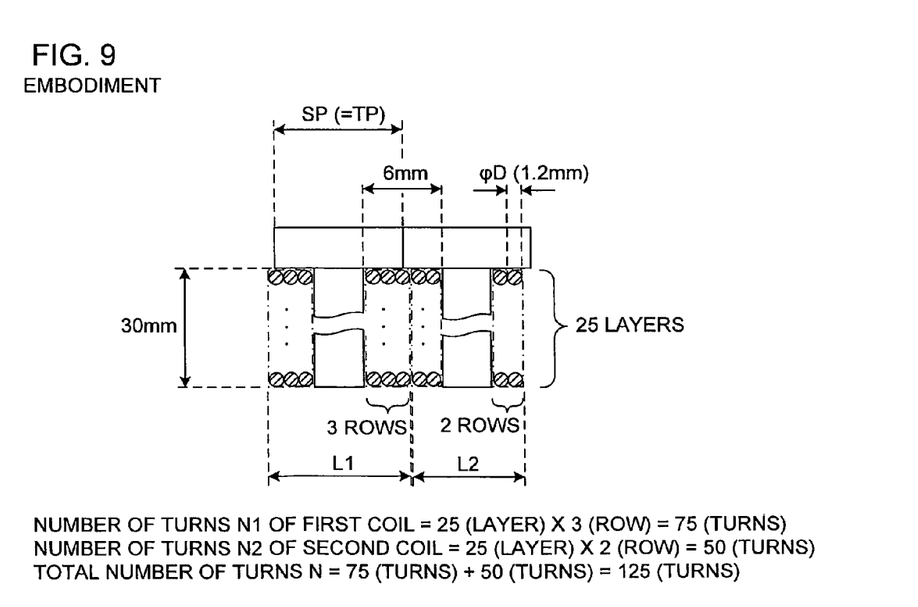
FIG. 9 is an explanatory view for explaining an example of a coil configuration of an embodiment.

As a result, for example, in the example mentioned above, it is possible to further select the coil having the wire diameter φD=2 mm or φD=1.2 mm, and it is possible to increase the options of the wire diameter of the coil. As a result, in the case of the wire diameter φD=2 mm as shown in FIG. 8, for example, the number of turns N1 of the first coil (the coil in a left side of FIG. 8) is 15 layers×2 rows (30 turns), the number of turns N2 of the second coil (the coil in a right side of FIG. 8) is 15 layers×1 row (15 turns), and the total number of turns N=30 turns+15 turns=45 turns is achieved. Further, as shown in FIG. 9, in the case of the wire diameter φD=1.2 mm, for example, the number of turns N1 of the first coil (the coil in a left side of FIG. 9) is 25 layers×3 rows (75 turns), the number of turns N2 of the second coil (the coil in a right side of FIG. 9) is 25 layers×2 row (50 turns), and the total number of turns N=75 turns+50 turns=125 turns is achieved. Since an intermediate number of turns can be obtained as mentioned above, it is possible to increase the degree of freedom of the number of turns of the coil. Further, since the wire diameter φD can be made identical between the first and second coils, it is possible to wind the continuous in-phase coil with a single stroke, and it is possible to improve productivity.

Figure 10:
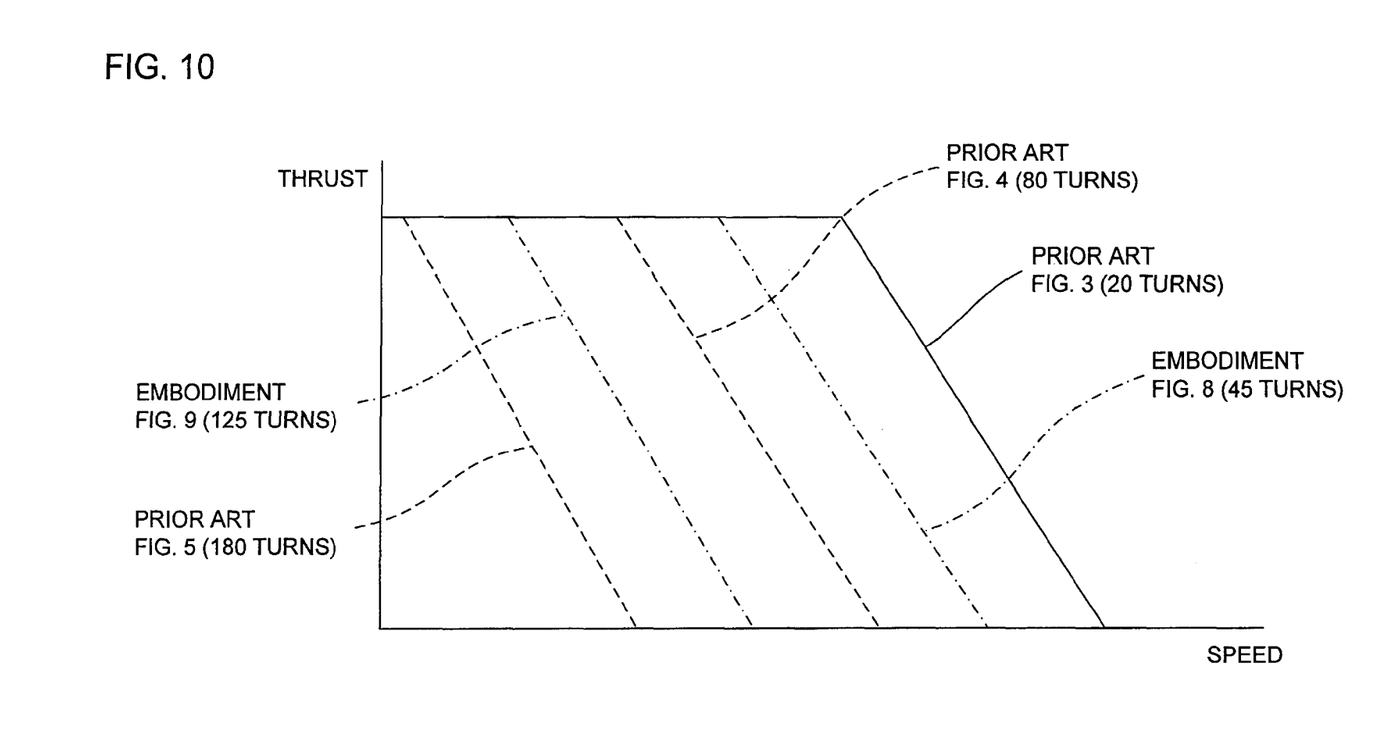
FIG. 10 is a graph showing a thrust-speed characteristic which is obtained by the motors of the prior arts and the embodiment.

As a result of the above, according to the present embodiment, since it is possible to obtain an intermediate output characteristic (thrust-speed characteristic) as shown in FIG. 10, it is possible to obtain an output characteristic which corresponds to the demand of the user.

Further, the present embodiment particularly has an effect that the space factor of the coil can be prevented from being lowered and the motor constant can be prevented from being lowered, in comparison with the case of application to a motor mentioned later in which three in-phase coils are continuously arranged, by application to the motor 100 of a slot combination in which two in-phase coils are continuously arranged.

The first and second coils mentioned in FIGS. 6 and 7 do not correspond to the first and second coils described in claims, but the first and second coils mentioned in FIGS. 2, 8 and 9 correspond to the first and second coils described in claims.

Modified Example

In the embodiment mentioned above, the description is given of the case that the slot combination is 5-pole and 6-slot (5P6S) as an example, but the slot combination is not limited to this. As the slot combination in which two in-phase coils are arranged, there are additionally, for example, a slot combination of 7-pole and 6-slot (7P6S), a slot combination of 10-pole and 12-slot (10P12S) and a slot combination of 14-pole and 12-slot (14P12S), and the present disclosure can be applied to these motors.

Further, it is possible to apply to a motor having a slot combination in which three in-phase coils are continuously arranged, without being limited to the motor in which two in-phase coils are continuously arranged. As the slot combination in which three in-phase coils are continuously arranged, there are, for example, a slot combination of 8-pole and 9-slot (8P9S) and a slot combination of 10-pole and 9-slot (10P9S). A description will be given of the present modified example with reference to FIGS. 11 and 12.

Figure 11:
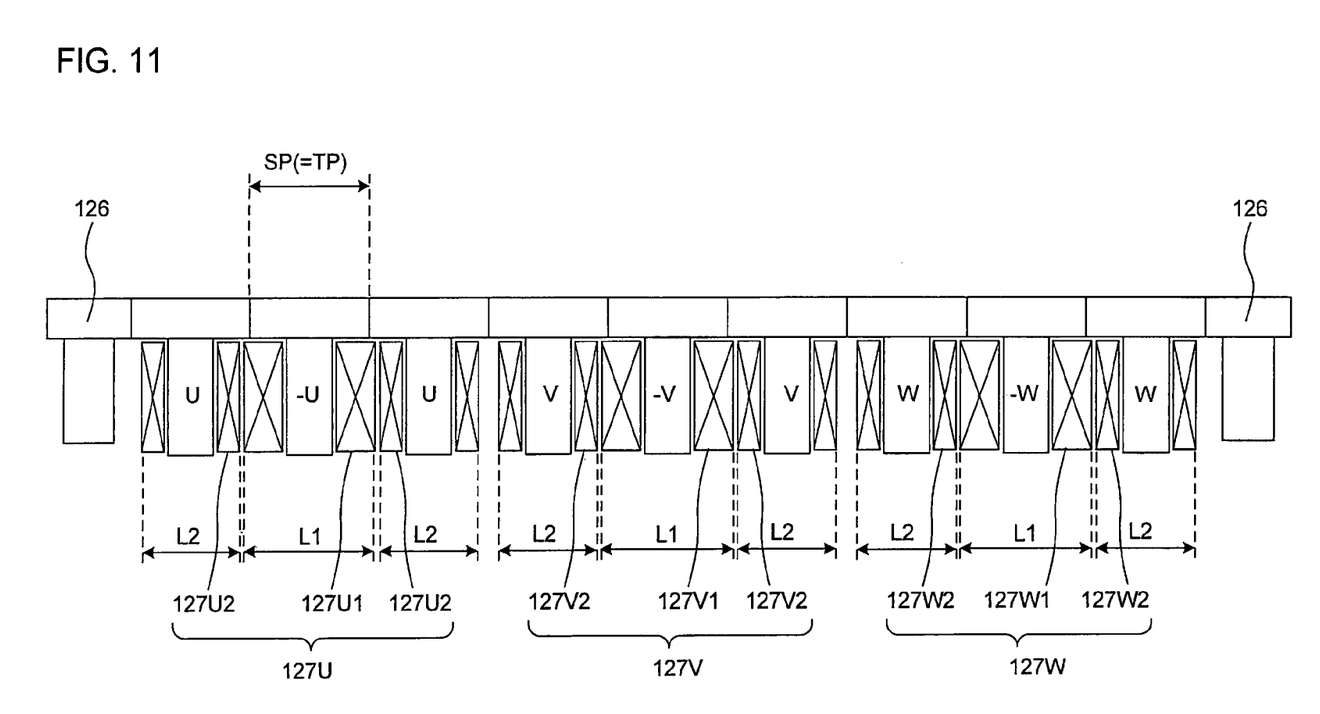
FIG. 11 is an explanatory view for explaining a coil arrangement configuration of a mover in a motor of a modified example.

As shown in FIG. 11, in a motor according to the present modified example, three in-phase coils 127 are continuously arranged in a relative movement direction (a lateral direction in FIG. 11). A mover 120 has a coil group including three continuously arranged in-phase coils 127 for each phase (U phase, V phase, W phase). A coil group 127U corresponding to the U phase has a first coil 127U1 and two second coils 127U2 which are three in-phase (U-phase) coils continuously arranged in the relative movement direction. A coil width L1 of the first coil 127U1 is larger than a slot pitch SP (=teeth pitch TP), the second coils 127U2 are respectively positioned on both sides of the first coil 127U1 in the relative movement direction, and a coil width L2 of the second coils 127U2 is smaller than the slot pitch SP. Further, the first coil 127U1 and two second coils 127U2 have the same wire diameter, and can be wound with a single stroke.

A coil group 127V corresponding to the V phase and a coil group 127W corresponding to the W phase also have the same configuration as that of the coil group 127U.

In the motor in which thee in-phase coils are continuously arranged, like the present modified example, for example, in the case that the first coils 127U1, 127V1, 127W1 each having the coil width L1 larger than the slot pitch SP are respectively arranged on both sides in the relative movement direction of the second coils 127U2, 127V2, 127W2 each having the coil width L2 smaller than the slot pitch SP, an arrangement relationship of the coil widths in the case that the coil groups 127U, 127V, 127W of the respective phases are arranged in the relative movement direction is "large, small, large", "large, small, large", and "large, small, large", and the arrangement cannot be achieved due to a dimensional restriction.

On the contrary, by respectively arranging two second coils 127U2, 127V2, 127W2 each having the coil width L2 which is smaller than the slot pitch SP on both sides in the relative movement direction of the first coils 127U1, 127V1, 127W1 each having the coil width L1 which is larger than the slot pitch SP, as shown in FIG. 11, the arrangement relationship of the coil widths in the case that the coil groups 127U, 127V, 127W for each phase are arranged in the relative movement direction is "small, large, small", "small, large, small", and "small, large, small", and the arrangement can be dimensionally achieved. Therefore, in the motor having the slot combination in which three in-phase coils are continuously arranged, it is possible to realize a motor which can improve productivity while increasing the degree of freedom of the number of turns of the coil.

Figure 12:
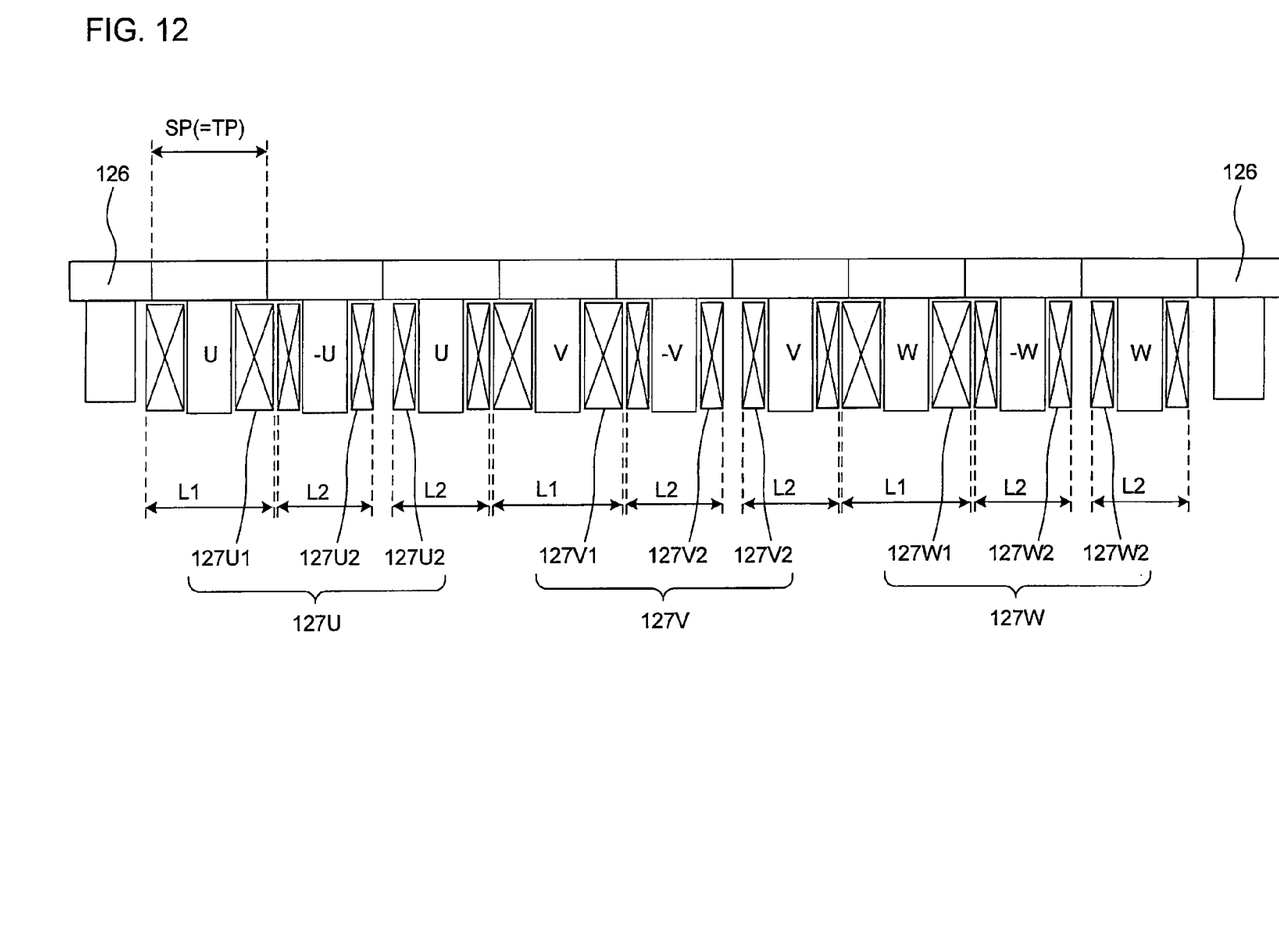
FIG. 12 is an explanatory view for explaining a coil arrangement configuration of a mover in a motor of a modified example

Further, in a motor 100 shown in FIG. 12, a coil group 127U corresponding to the U phase has a first coil 127U1 in which a coil width L1 is larger than the slot pitch SP, and two second coils 127U2 which are arranged on one side in a relative movement direction of the first coil 127U1 (a right side in FIG. 12 in this example, in which a left side in FIG. 12 may be employed), and have coil widths L2 smaller than the slot pitch SP. The first coil 127U1 and two second coils 127U2 have the same wire diameter, and can be wound with a single stroke. Further, a coil group 127V corresponding to the V phase and a coil group 127W corresponding to the W phase have the same configuration as the coil group 127U.

According to the present modified example, an arrangement relationship of the coil widths in the case that the coil groups 127U, 127V and 127W for each phase are arranged in the relative movement direction is "large, small, small", "large, small, small", and "large, small, small", or "small, small, large", "small, small, large", "small, small, large" and the arrangement can be dimensionally achieved. Therefore, in the motor having the slot combination in which three in-phase coils are continuously arranged, it is possible to realize a motor which can improve productivity while increasing the degree of freedom of the number of turns of the coil.

The description is given above of the case that the motor 100 is the linear synchronous motor as an example, but the present disclosure can be applied to a linear induction motor without being limited to this. Further, the present disclosure may be applied to a rotary type motor without being limited to the linear motor.

Further, it is possible to appropriately combine and utilize the techniques according to the embodiment and the respective modified example, in addition to the previously mentioned structures.

In addition, the present disclosure can be executed by applying various changes within the range which does not deviate from the scope of the disclosure, although every change is not exemplified.

What is claimed is:
1. A motor comprising:
a stator and a mover which are arranged facing each other so as to be relatively movable via a magnetic air gap,
any one of the stator and the mover including:
a yoke;
a plurality of teeth disposed protruding from the yoke to the magnetic air gap side; and
a plurality of coils wound around the plurality of teeth;
the plurality of coils including, for each phase, coil groups each including a plurality of the coils which are continuously arranged along the relative movement direction and are in-phase with each other and have the same wire diameter with each other, and
the coil group comprising at least one the coil in which a coil width in the relative movement direction is larger than a teeth pitch in the relative movement direction.
2. The motor according to claim 1, wherein:
the coil group comprises two of the coils which are continuously arranged along the relative movement direc- tion and are in-phase with each other and have the same wire diameter with each other, and the two coils are a first coil in which the coil width is larger than the teeth pitch, and a second coil in which the coil width is smaller than the teeth pitch.

3. The motor according to claim 2, wherein:

sum of the coil widths of the first coil and the coil widths of the second coil approximately coincides with twice the teeth pitch.

4. The motor according to claim 1, wherein:

the coil group comprises three of the coils which are continuously arranged along the relative movement direction and are in-phase with each other and have the same wire diameter with each other, and the three coils are a first coil in which the coil width is larger than the teeth pitch, and two second coils which are positioned on both sides of the first coil in the relative movement direction, and in which the coil width is smaller than the teeth pitch.

5. The motor according to claim 1, wherein:

the coil group comprises three of the coils which are continuously arranged along the relative movement direction and are in-phase with each other and have the same wire diameter with each other, and the three coils are a first coil in which the coil width is larger than the teeth pitch, and two second coils which are positioned on one side of the first coil in the relative movement direction, and in which the coil width is smaller than the teeth pitch.

\* \* \* \* \*